US012512244B2

(12) United States Patent
Eliason et al.

(10) Patent No.: US 12,512,244 B2
(45) Date of Patent: Dec. 30, 2025

(54) DETACHABLE MAGNETIC HOLDING DEVICE

(71) Applicant: Magnetic Mechanisms L.L.C., Shoreview, MN (US)

(72) Inventors: Jeffery M. Eliason, Shoreview, MN (US); Mitchell Porch, Grand Rapids, MI (US); Joseph Funk, St. Paul, MN (US); Braden J. Eliason, Minneapolis, MN (US); Benjamin J. Larsen, St. Paul, MN (US); David A. Melander, Saint Louis Park, MN (US); Rebecca E. Wereley, Richfield, MN (US)

(73) Assignee: Magnetic Mechanisms L.L.C., Shoreview, MN (US)

(*) Notice: Subject to any disclaimer, the term of this patent is extended or adjusted under 35 U.S.C. 154(b) by 188 days.

(21) Appl. No.: 18/455,141

(22) Filed: Aug. 24, 2023

(65) Prior Publication Data

US 2024/0071668 A1 Feb. 29, 2024

Related U.S. Application Data

(60) Provisional application No. 63/400,991, filed on Aug. 25, 2022.

(51) Int. Cl.
*H01F 7/02* (2006.01)
*H01F 7/04* (2006.01)

(52) U.S. Cl.
CPC ............ *H01F 7/0205* (2013.01); *H01F 7/04* (2013.01)

(58) Field of Classification Search
CPC ......... H01F 7/0205; H01F 7/04; H01F 7/0252
See application file for complete search history.

(56) References Cited

U.S. PATENT DOCUMENTS 3,014,751 A 12/1961 Smith
3,241,516 A 3/1966 Hopkins
(Continued)

FOREIGN PATENT DOCUMENTS

AU 753496 B2 6/2001
AU 2002325077 B2 3/2003
(Continued)

OTHER PUBLICATIONS

Supplementary European Search Report for Application No. EP 15 85 21 27, dated Aug. 16, 2018, 2 pages.
(Continued)

*Primary Examiner* — Mohamad A Musleh
(74) *Attorney, Agent, or Firm* — Christensen, Fonder, Dardi & Herbert PLLC; John P. Fonder

(57) ABSTRACT

A detachable magnetic device includes a body portion, a levering cover, a magnet-retaining portion, a magnet, and a grip material. The body portion defines a first surface, a second opposing surface, and a magnet-receiving opening. A cam portion of the levering cover is pivotally connected to an end of the body portion. The magnet-retaining portion extends across part of the first surface of the body portion. The magnet is coupled to the magnetic-retaining portion and disposed within the magnet-receiving opening. The grip material surrounds the magnet-receiving opening. The magnet is configured to magnetically couple the detachable magnetic device to a ferromagnetic object and the cam portion is configured to contact a surface of the ferromagnetic object when the levering cover rotated relative to the body portion to release the detachable magnetic device from the ferromagnetic object.

20 Claims, 8 Drawing Sheets

(56) References Cited

U.S. PATENT DOCUMENTS

| | | | |
|---|---|---|---|
| 3,419,832 | A | 12/1968 | Baermann |
| 3,539,800 | A | 11/1970 | Doring |
| 4,200,852 | A | 4/1980 | Aoki |
| 6,076,790 | A | 6/2000 | Richter |
| 6,491,271 | B1 | 12/2002 | Adams |
| 6,564,678 | B1 | 5/2003 | Wang |
| 6,653,920 | B1 | 11/2003 | Chen |
| 7,012,495 | B2 | 3/2006 | Underwood et al. |
| 7,172,079 | B1 | 2/2007 | Shiao |
| 7,207,091 | B2 | 4/2007 | Dunaye |
| 7,746,205 | B2 | 6/2010 | Fullerton et al. |
| 7,750,774 | B2 | 7/2010 | Fullerton et al. |
| 7,750,777 | B2 | 7/2010 | Fullerton et al. |
| 7,750,778 | B2 | 7/2010 | Fullerton et al. |
| 7,750,780 | B2 | 7/2010 | Fullerton et al. |
| 7,750,781 | B2 | 7/2010 | Fullerton et al. |
| 7,755,462 | B2 | 7/2010 | Fullerton et al. |
| 7,772,952 | B2 | 8/2010 | Fullerton et al. |
| 7,800,471 | B2 | 9/2010 | Fullerton et al. |
| 7,800,472 | B2 | 9/2010 | Fullerton et al. |
| 7,800,473 | B2 | 9/2010 | Fullerton et al. |
| 7,808,348 | B2 | 10/2010 | Fullerton et al. |
| 7,808,349 | B2 | 10/2010 | Fullerton et al. |
| 7,808,350 | B2 | 10/2010 | Fullerton et al. |
| 7,834,728 | B2 | 11/2010 | Fullerton et al. |
| 7,834,729 | B2 | 11/2010 | Fullerton et al. |
| 7,839,247 | B2 | 11/2010 | Fullerton et al. |
| 7,839,248 | B2 | 11/2010 | Fullerton et al. |
| 7,843,294 | B2 | 11/2010 | Fullerton et al. |
| 7,855,624 | B2 | 12/2010 | Fullerton et al. |
| 7,868,721 | B2 | 1/2011 | Fullerton et al. |
| 7,889,038 | B2 | 2/2011 | Fullerton et al. |
| 7,982,568 | B2 | 7/2011 | Fullerton et al. |
| 8,035,260 | B2 | 10/2011 | Fullerton et al. |
| 8,098,122 | B2 | 1/2012 | Fullerton et al. |
| 8,115,581 | B2 | 2/2012 | Fullerton et al. |
| 8,174,347 | B2 | 5/2012 | Fullerton et al. |
| 8,179,219 | B2 | 5/2012 | Fullerton et al. |
| 8,279,031 | B2 | 10/2012 | Fullerton et al. |
| 8,279,032 | B1 | 10/2012 | Fullerton et al. |
| 8,314,671 | B2 | 11/2012 | Fullerton et al. |
| 8,314,672 | B2 | 11/2012 | Fullerton et al. |
| 8,350,663 | B1 | 1/2013 | Michael |
| 8,354,909 | B2 | 1/2013 | Fullerton et al. |
| 8,356,400 | B2 | 1/2013 | Fullerton et al. |
| 8,368,495 | B2 | 2/2013 | Fullerton et al. |
| 8,373,527 | B2 | 2/2013 | Fullerton et al. |
| 8,461,952 | B1 | 6/2013 | Fullerton et al. |
| 8,502,630 | B2 | 8/2013 | Richards et al. |
| 8,570,129 | B2 | 10/2013 | Fullerton et al. |
| 8,570,130 | B1 | 10/2013 | Fullerton et al. |
| 8,576,036 | B2 | 11/2013 | Fullerton et al. |
| 8,593,242 | B2 | 11/2013 | Fullerton et al. |
| 8,643,454 | B2 | 2/2014 | Fullerton et al. |
| 8,648,681 | B2 | 2/2014 | Roberts et al. |
| 8,692,637 | B2 | 4/2014 | Richards et al. |
| 8,698,583 | B2 | 4/2014 | Fullerton et al. |
| 8,702,437 | B2 | 4/2014 | Fullerton et al. |
| 8,704,626 | B2 | 4/2014 | Fullerton et al. |
| 8,717,131 | B2 | 5/2014 | Fullerton et al. |
| 8,760,250 | B2 | 6/2014 | Fullerton et al. |
| 8,760,251 | B2 | 6/2014 | Roberts et al. |
| 8,760,252 | B2 | 6/2014 | Fullerton et al. |
| 8,779,877 | B2 | 7/2014 | Fullerton et al. |
| 8,779,879 | B2 | 7/2014 | Roberts et al. |
| 8,810,348 | B2 | 8/2014 | Fullerton et al. |
| 8,816,805 | B2 | 8/2014 | Fullerton et al. |
| 8,841,981 | B2 | 9/2014 | Fullerton et al. |
| 8,844,121 | B2 | 9/2014 | Fullerton et al. |
| 8,848,973 | B2 | 9/2014 | Fullerton et al. |
| 8,857,044 | B2 | 10/2014 | Fullerton et al. |
| 8,872,608 | B2 | 10/2014 | Fullerton et al. |
| 8,878,639 | B2 | 11/2014 | Kocijan |
| 8,917,154 | B2 | 12/2014 | Fullerton et al. |
| 8,937,521 | B2 | 1/2015 | Fullerton et al. |
| 8,947,185 | B2 | 2/2015 | Fullerton et al. |
| 8,957,751 | B2 | 2/2015 | Fullerton et al. |
| 8,963,380 | B2 | 2/2015 | Fullerton et al. |
| 8,963,668 | B2 | 2/2015 | Fullerton et al. |
| 9,082,539 | B2 | 7/2015 | Fullerton |
| 9,093,207 | B2 | 7/2015 | Fullerton et al. |
| 9,105,380 | B2 | 8/2015 | Roberts et al. |
| 9,105,384 | B2 | 8/2015 | Fullerton et al. |
| 9,111,672 | B2 | 8/2015 | Fullerton et al. |
| 9,111,673 | B2 | 8/2015 | Fullerton et al. |
| 9,202,615 | B2 | 12/2015 | Fullerton et al. |
| 9,202,616 | B2 | 12/2015 | Fullerton et al. |
| 9,219,403 | B2 | 12/2015 | Evans |
| 9,245,677 | B2 | 1/2016 | Fullerton et al. |
| 9,257,219 | B2 | 2/2016 | Fullerton et al. |
| 9,269,482 | B2 | 2/2016 | Fullerton |
| 9,275,783 | B2 | 3/2016 | Fullerton et al. |
| 9,277,813 | B2 | 3/2016 | Nelson |
| 9,298,281 | B2 | 3/2016 | Fullerton et al. |
| 9,312,634 | B2 | 4/2016 | Fullerton et al. |
| 9,365,049 | B2 | 6/2016 | Fullerton |
| 9,367,783 | B2 | 6/2016 | Fullerton et al. |
| 9,371,923 | B2 | 6/2016 | Fullerton et al. |
| 9,404,776 | B2 | 8/2016 | Fullerton et al. |
| 9,406,424 | B2 | 8/2016 | Fullerton et al. |
| 9,412,506 | B2 | 8/2016 | Fullerton et al. |
| 9,536,650 | B2 | 1/2017 | Fullerton |
| 9,588,599 | B2 | 3/2017 | Fullerton et al. |
| 9,689,527 | B2 | 6/2017 | Franklin |
| 9,711,268 | B2 | 7/2017 | Fullerton et al. |
| 9,920,783 | B2 | 3/2018 | Runge et al. |
| 10,008,817 | B2 | 6/2018 | Fullerton et al. |
| 10,173,292 | B2 | 1/2019 | Fullerton et al. |
| 10,194,246 | B2 | 1/2019 | Morgan et al. |
| 10,204,727 | B2 | 2/2019 | Fullerton et al. |
| 10,736,273 | B1 | 8/2020 | Kacines |
| 10,903,030 | B2 | 1/2021 | Morton et al. |
| 10,906,606 | B2 | 2/2021 | Ball et al. |
| 11,097,401 | B2 | 8/2021 | Morton et al. |
| D930,354 | S | 9/2021 | Morton et al. |
| 11,482,359 | B2 | 10/2022 | Eliason et al. |
| 11,915,862 | B2 | 2/2024 | Eliason et al. |
| 2004/0239460 | A1 | 12/2004 | Kocijan |
| 2005/0156085 | A1 | 7/2005 | Radovan |
| 2005/0216125 | A1 | 9/2005 | Hutson et al. |
| 2007/0041777 | A1 | 2/2007 | Dietz |
| 2007/0107665 | A1 | 5/2007 | Enoch |
| 2007/0194187 | A1 * | 8/2007 | Amron ...................... G09F 7/04 248/206.5 |
| 2009/0211533 | A1 | 8/2009 | Sprung |
| 2011/0056437 | A1 | 3/2011 | Sprung |
| 2013/0002382 | A1 | 1/2013 | Zhang |
| 2013/0222091 | A1 | 8/2013 | Fullerton et al. |
| 2013/0320686 | A1 | 12/2013 | Morton |
| 2015/0357105 | A1 | 12/2015 | Taylor |
| 2016/0289046 | A1 | 10/2016 | Norton et al. |
| 2017/0053725 | A1 | 2/2017 | St. Onge |
| 2018/0032104 | A1 | 2/2018 | Schatz et al. |
| 2020/0081483 | A1 | 3/2020 | Laurent et al. |
| 2020/0148303 | A1 | 5/2020 | Ball et al. |
| 2020/0169126 | A1 | 5/2020 | Morton et al. |
| 2021/0154881 | A1 | 5/2021 | Klein et al. |
| 2021/0180642 | A1 | 6/2021 | Botkus et al. |
| 2021/0265089 | A1 | 8/2021 | Eliason et al. |
| 2021/0268615 | A1 | 9/2021 | Morton et al. |
| 2021/0323634 | A1 | 10/2021 | Ball et al. |
| 2022/0003355 | A1 | 1/2022 | Hsu |
| 2022/0045594 | A1 | 2/2022 | Morton et al. |
| 2022/0072698 | A1 | 3/2022 | Morton et al. |
| 2022/0415552 | A1 | 12/2022 | Eliason et al. |
| 2024/0071667 | A1 | 2/2024 | Eliason et al. |
| 2024/0071669 | A1 | 2/2024 | Eliason et al. |

FOREIGN PATENT DOCUMENTS

| | | | |
|---|---|---|---|
| AU | 2002325077 | A1 | 6/2003 |
| AU | 2006294433 | A1 | 3/2007 |
| AU | 2007224996 | B2 | 9/2007 |
| CN | 102217026 | | 10/2011 |

(56) References Cited

FOREIGN PATENT DOCUMENTS

| | | | | |
|---|---|---|---|---|
| CN | 102369582 | | 3/2012 | |
| CN | 102804291 | | 11/2012 | |
| CN | 104287594 | A | 1/2015 | |
| CN | 106055042 | A | 10/2016 | |
| CN | 110901793 | | 3/2020 | |
| DE | 102004015873 | A1 * | 10/2005 | ........... H01F 7/0242 |
| DE | 10 2010 003 952 | A1 | 10/2011 | |
| DE | 20 2011 101 534 | U1 | 11/2011 | |
| DE | 10 2012 223 976 | A1 | 6/2014 | |
| DE | 20 2016 006 696 | U1 | 1/2017 | |
| DE | 10 2016 225 750 | A1 | 6/2018 | |
| DE | 10 2016 225 893 | A1 | 6/2018 | |
| EP | 1 425 763 | B1 | 2/2017 | |
| EP | 2 438 601 | B1 | 3/2017 | |
| EP | 3 166 749 | B1 | 8/2021 | |
| EP | 3746261 | A4 | 11/2021 | |
| GB | 444786 | A | 3/1936 | |
| JP | S61187525 | U | 11/1986 | |
| JP | H09 92525 | A | 4/1997 | |
| JP | 2003-052574 | A | 2/2003 | |
| JP | 2006-321149 | A | 11/2006 | |
| JP | 5559770 | | 9/2011 | |
| JP | 2012-513997 | | 6/2012 | |
| JP | 2012-530950 | | 12/2012 | |
| JP | 5604715 | | 10/2015 | |
| JP | 2018-510790 | | 4/2018 | |
| KR | 10-2004-0065521 | A | 7/2004 | |
| KR | 10-0839166 | B1 | 6/2008 | |
| KR | 10-2008-0094328 | | 10/2008 | |
| KR | 10-863560 | B1 | 10/2008 | |
| KR | 10-2008-0098705 | | 11/2008 | |
| KR | 10-1919096 | B1 | 11/2008 | |
| KR | 10-1243599 | B1 | 3/2013 | |
| KR | 10-1460840 | B1 | 11/2014 | |
| KR | 10-2015-0005071 | | 1/2015 | |
| KR | 10-2015-0053576 | | 5/2015 | |
| KR | 10-1672986 | B1 | 11/2016 | |
| KR | 10-1715922 | B1 | 3/2017 | |
| KR | 10-2017-0096643 | | 8/2017 | |
| KR | 10-2017-0126532 | | 11/2017 | |
| KR | 10-2018-0037615 | | 4/2018 | |
| KR | 10-1847297 | B1 | 5/2018 | |
| KR | 10-2018-0060185 | | 6/2018 | |
| KR | 10-2020-0017717 | | 2/2020 | |
| KR | 10-2020-0095707 | A | 8/2020 | |
| KR | 10-2200860 | B1 | 1/2021 | |
| KR | 10-2200861 | B1 | 1/2021 | |
| WO | WO 2005/012757 | A1 | 2/2005 | |
| WO | WO 2009/000008 | A1 | 12/2008 | |
| WO | WO 2009/000599 | A1 | 12/2008 | |
| WO | WO 2009/140750 | A2 | 11/2009 | |
| WO | WO 2010/020006 | A1 | 2/2010 | |
| WO | WO 2010/135788 | A1 | 12/2010 | |
| WO | WO 2018/008993 | A1 | 1/2018 | |
| WO | WO 2018/227140 | A1 | 12/2018 | |
| WO | WO 2019/165228 | A1 | 8/2019 | |

OTHER PUBLICATIONS

Notification of Transmittal of the International Search Report and the Written Opinion of the International Searching Authority, or the Declaration for Application No. PCT/US2021/018587, dated Aug. 6, 2021, (21 pages).

Notification of Transmittal of the International Search Report and the Written Opinion of the International Searching Authority, or the Declaration for Application No. PCT/US2023/030934, dated Oct. 16, 2023, (6 pages).

Notification of Transmittal of the International Search Report and the Written Opinion of the International Searching Authority, or the Declaration for Application No. PCT/US2023/031051, dated Nov. 15, 2023, (8 pages).

Notification of Transmittal of the International Search Report and the Written Opinion of the International Searching Authority, or the Declaration for Application No. PCT/US2023/031059, dated Jan. 3, 2024, (10 pages).

Notification of Transmittal of the International Search Report and the Written Opinion of the International Searching Authority, or the Declaration for Application No. PCT/US2023/031049, dated Jan. 8, 2024, (16 pages).

Amazon.com, Site visited Sep. 17, 2025, MAGTSMEI Black Magnetic Hooks Heavy Duty, Date first available, Dec. 14, 2021, https://www.amazon.com/MAGTSMEI-Magnetic-Neodymium-Refrigerator-Industrial/dp/B09NM7B6QG/ref=ast_sto_dp_puis?th=1 (Year: 2021).

Amazon.com, Site visited Sep. 17, 2025, ENUODA Strong Magnetic Hooks Heavy Duty, Date first available, Feb. 26, 2024, https://www.amazon.com/ENUODA-Magnetic-Magnets-Utility-Extension/dp/BOCWGW4JLD?ref_=ast_sto_dp&th=1 (Year: 2024).

Amazon.com, Site visited Sep. 17, 2025, Findmag Magnetic Hooks, Date first available, Oct. 17, 2023, https://www.amazon.com/FINDMAG-Magnetic-Neodymium-Hanging-Refrigerator/dp/BOCC8WVB57?ref_=ast_sto_dp&th=1 (Year:2023).

Amazon.com, Site visited Sep. 17, 2025, Magnetic Hooks for Grill & Refrigerator, Date first available, Jul. 10, 2024, https://www.amazon.com/Magnetic-Refrigerator-4-Pack-Rubber-Coated/dp/B0D9644TKP/ref=sr_1_2?dib=eyJ2IjoiMSJ9.qUf5v3fcOsJLDCzHQ13YZxhEhD73EXURaOP7zDE4BYwpZ-NpH97x9W7RBGFWJIB7BfUtTwe4Q3b1JSOqESqBWLbskhxVi8vjMQrMn3kMhdAPB_0bp8dE9otH2pAPw6tDe04oh2FP0fA922B2smN_omcggG18dbKgu7y70Wg7ySE4OBVKVYGXsjRRAnR-5iIcNlydoh7j4OL3F9ufVFdDW4bZ1cF40x8atQJu-3HfLpaf5pTBX3jPjytvrO9UhHvI.glqMaaB3VhbuA4qCI6cWr_WyYUiMiDAhCayNtpyd6ws&dib_tag=se&qid=1757689830&refinements=p_89%3AJINGZHAN&sr=8-2&srs=121075627011&th=1 (Year:2024).

* cited by examiner

DETACHABLE MAGNETIC HOLDING DEVICE

CROSS-REFERENCE TO RELATED APPLICATIONS

This application claims the benefit of U.S. Provisional Patent Application No. 63/400,991, filed Aug. 25, 2022, which is incorporated herein in its entirety.

FIELD OF THE INVENTION

The invention relates generally to detachable magnetic holding devices for attaching to a ferromagnetic object and holding objects therefrom.

BACKGROUND

This disclosure related generally to devices having one or more magnets which generate magnetic attraction forces with ferromagnetic objects.

SUMMARY

Detachable magnetic holding devices for attaching to a ferromagnetic object and hanging other objects therefrom and methods for forming the same are disclosed.

In some examples, a detachable magnetic device may include a body portion, a levering cover, a pin, a magnet-retaining portion, a magnet, and a grip material. The body portion, defining a first surface and a second surface opposite the first surface, includes a hook end, a pivot end opposite hook end and defining a pin-receiving channel, and a main portion disposed between hook end and pivot end and defining a magnet-receiving opening. The levering cover includes a lever portion and a cam portion defining one or more pin-receiving holes. The pin extends through the pin-receiving channel and at least a portion of the one or more pin-receiving holes to pivotally couple the body portion to the levering cover. The magnet-retaining portion extends across at least a portion of the first surface of the body portion. The magnet defines a first surface coupled to the magnetic-retaining portion and a second surface opposite the first surface. At least a portion of the magnet is disposed within the magnet-receiving opening and the second surface of the magnet extends substantially parallel to the second surface of the body portion. The grip material is disposed on the body portion and extending beyond the second surface of the body portion. The magnet is configured to magnetically couple the detachable magnetic device to a ferromagnetic object.

In other examples, a detachable magnetic device may include a body portion, a levering cover, a magnet-retaining portion, a magnet, and a grip material. The body portion defines a first surface and a second surface opposite the first surface. The body portion also defines a magnet-receiving opening. The levering cover includes a lever portion and a cam portion. The cam portion is pivotally connected to an end of the body portion. The magnet-retaining portion extends across at least a portion of the first surface of the body portion. The magnet is coupled to the magnetic-retaining portion and at least a portion of the magnet is disposed within the magnet-receiving opening. The grip material is disposed on the second surface of the body portion and surrounding at least a portion of the magnet-receiving opening. The magnet is configured to magnetically couple the detachable magnetic device to a ferromagnetic object. The cam portion is configured to contact a surface of the ferromagnetic object when the levering cover rotated relative to the body portion.

In some examples, a method of forming a detachable magnetic device may include forming a body portion defining a first surface and a second surface opposite the first surface, where the body portion defines a magnet-receiving opening. The method also may include forming a levering cover including a lever portion and a cam portion. The method also may include positioning a magnetic-retaining portion on the first surface of the body portion. The method also may include coupling a first surface of a magnet to the magnetic-retaining portion, such that at least a portion of the magnet is disposed within the magnet-receiving opening. The method also may include positioning a grip material on the second surface of the body portion to surround at least a portion of the magnet-receiving opening. The method also may include coupling the levering cover to the body portion, where the cam portion is pivotally connected to an end of the body portion.

BRIEF DESCRIPTION OF THE DRAWINGS

The invention can be understood in consideration of the following detailed description of various embodiments of the invention in connection with the accompanying drawings, in which.

The drawings included in the present patent application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
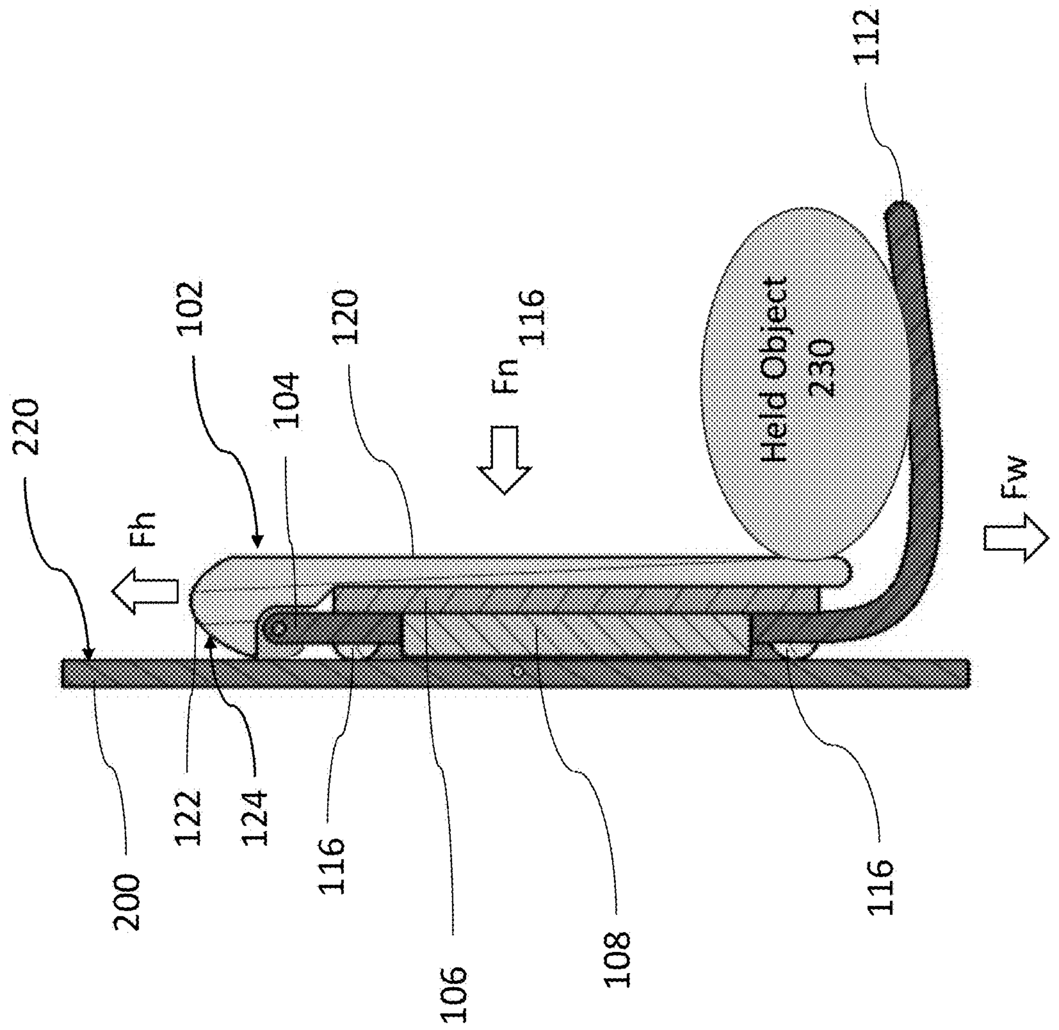
FIG. 1 is a sectional view of detachable magnetic holding device attached to a ferromagnetic object, according to an embodiment.
Figure 2:
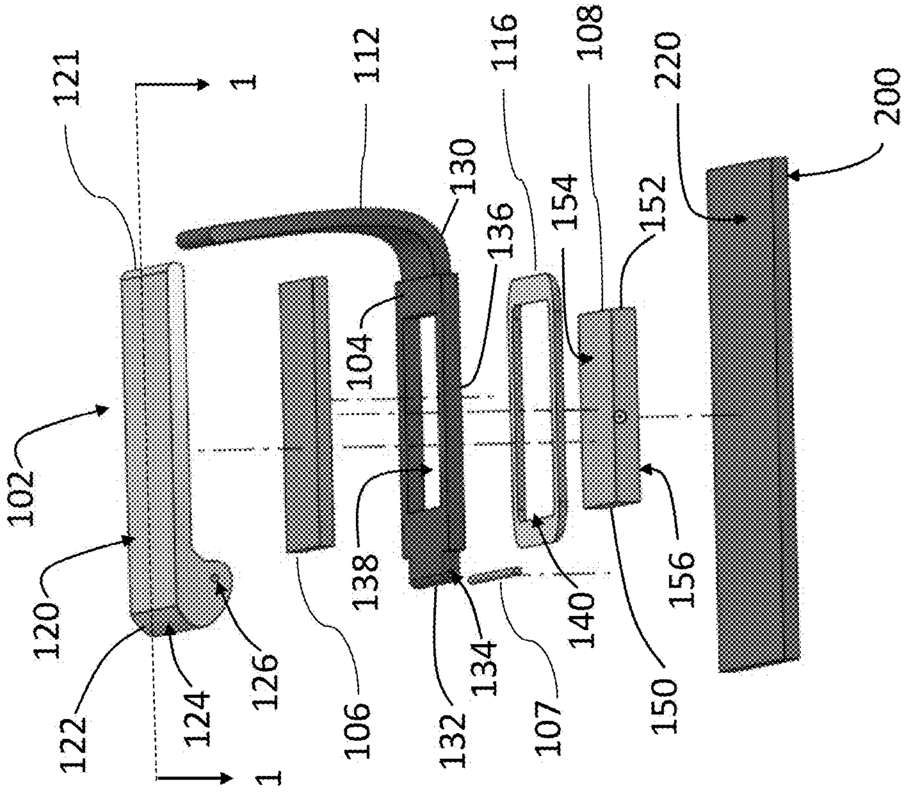
FIG. 2 is an exploded view of the device of FIG. 1, according to an embodiment.
Figure 3:
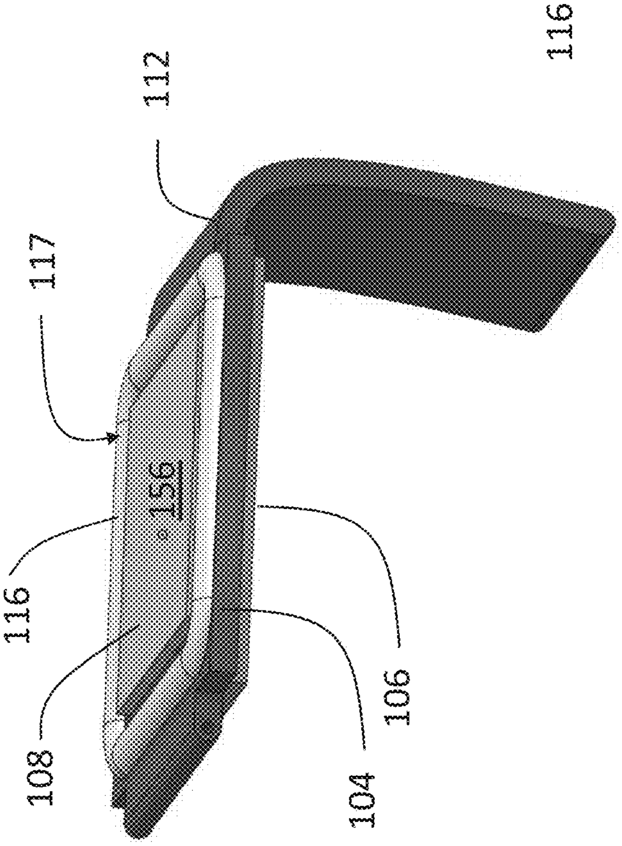
FIG. 3 is a subassembly of the device of FIG. 1, according to an embodiment.
Figure 4:
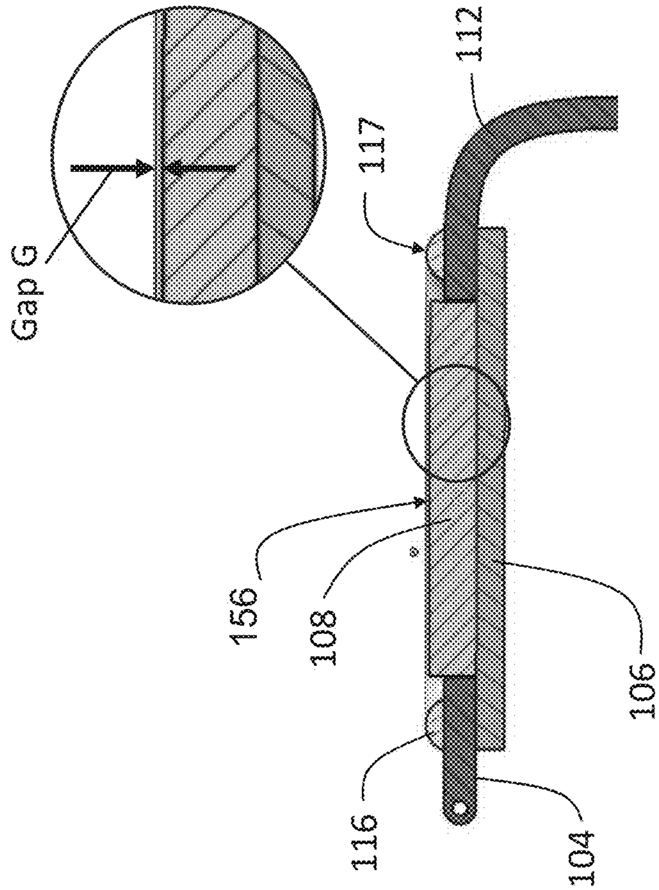
FIG. 4 is a sectional view of the subassembly of FIG. 3, according to an embodiment.
Figure 5:
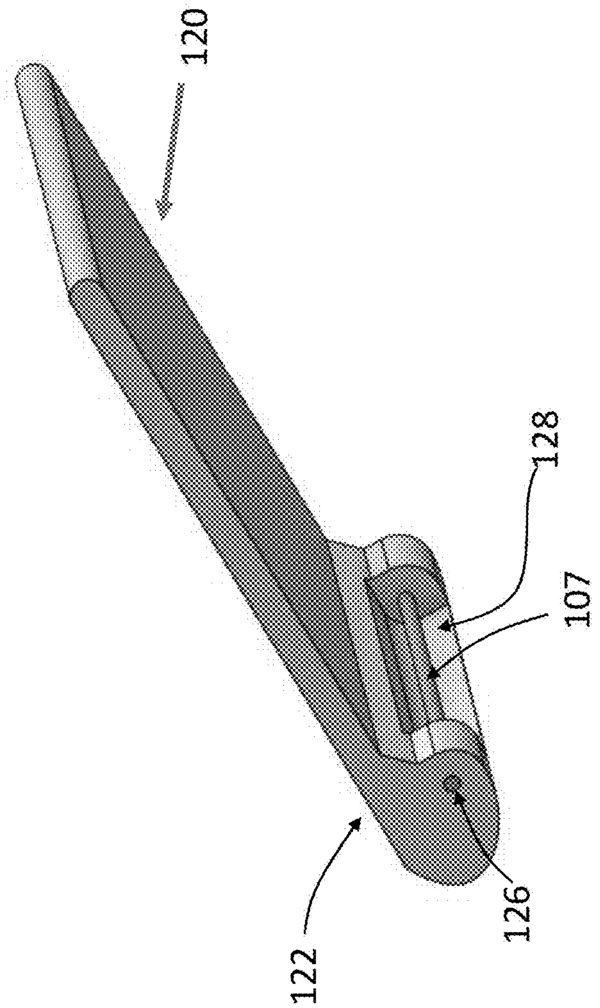
FIG. 5 is a perspective view of a cover of the device of FIG. 1, according to an embodiment.
Figure 6:
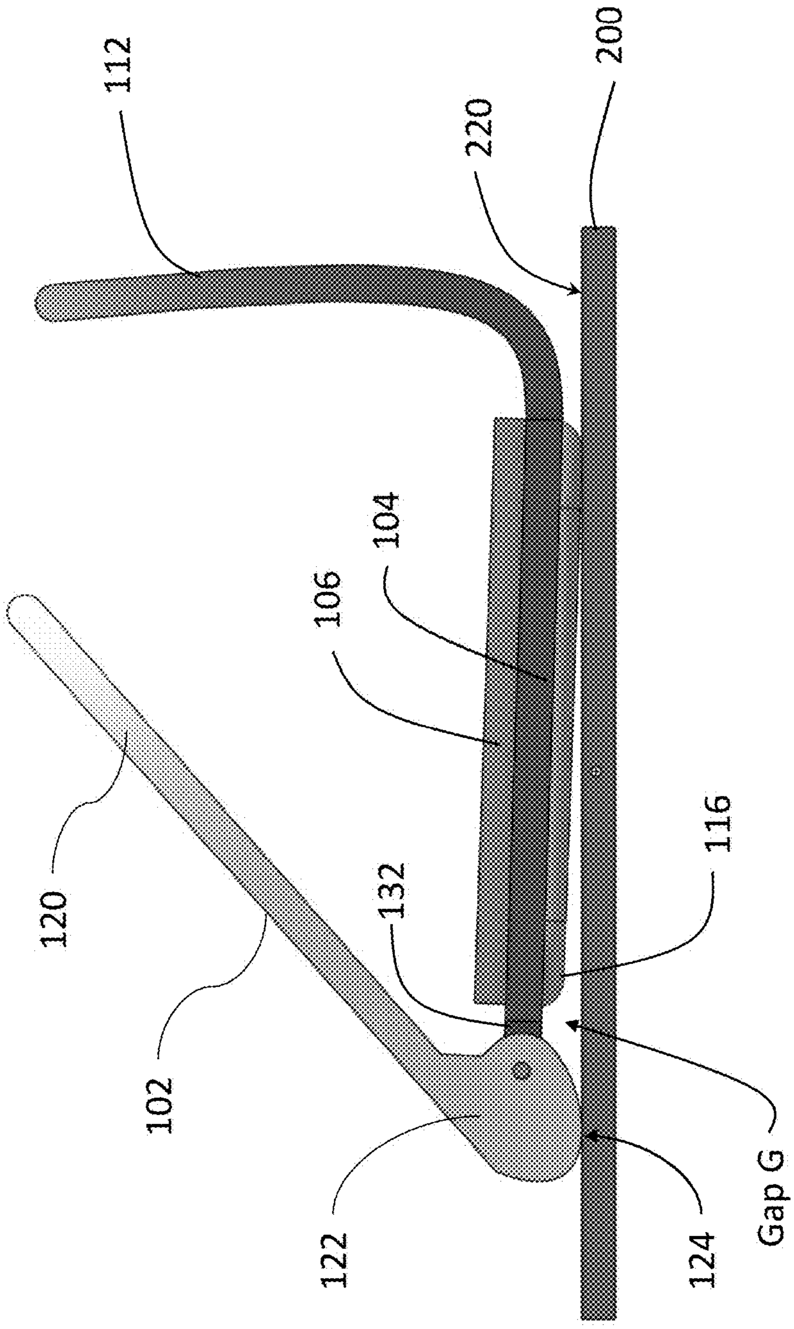
FIG. 6 is a sectional view of the device of FIG. 1, in a release configuration, according to an embodiment.

Referring to FIGS. 1-6, an embodiment of a detachable magnetic holding device 100 is depicted. FIG. 1 is a lengthwise, central sectional view of device 100 magnetically coupled to ferromagnetic object 200 at surface 220. FIG. 2 is an exploded view of device 100. FIG. 3 is a subassembly of device 100 that includes body portion 104, shunt plate 106, magnet 108 and grip material 116, as will be described further below. FIG. 4 is a sectional view of the subassembly of FIG. 3. FIG. 5 is a perspective view of levering cover 102. FIG. 6 is a sectional view of device 100 in a release configuration.

Embodiments of device 100 are configured to magnetically and forcefully attach to a ferromagnetic target object 200 having surface 220. Held objects 230 may be connected to, or held by, device 100, so that the objects held by device 100 are also held or positioned near or adjacent to, a ferromagnetic object 200 and its surface 220. For example, device 100 may be magnetically attached to a surface of a steel panel (an example ferromagnetic object) of a cabinet, and device 100 may hold a tool (an example held object).

In an embodiment, device 100 includes levering cover 102, body portion 104, magnet-retaining portion (also referred to herein as a shunt plate) 106, magnetic device 108, hook portion 112, and grip material 116.

In an embodiment, levering cover 102 includes lever portion 120 and cam portion 122 with outer contact surface 124. As illustrated in FIG. 2, cam portion 122 defines pin-receiving holes **126*a* and 126*b* (collectively, pin-receiving holes 126) configured to receive a pin 107 therethrough. Cam portion 122 also defines a cam cavity 128 configured to receive therein at least a portion of body portion 104, magnetic-retaining device 106, or both. Levering cover 102 may comprise any of a variety of materials, including one or more plastics or one or more metals. A more rigid or high-durometer material may reduce flexing of lever portion 120 which may be advantageous when using levering cover 102 to remove devices 100 producing high normal forces Fn from ferromagnetic object 200**.

In an embodiment, lever portion 120 is generally rectangular and plate-like, though other embodiments are contemplated. In an embodiment, lever portion 120 extends lengthwise further than shunt plate 106 such that a lifting end 121 is easily graspable by a user. For example, lifting end 121 may be configured (e.g., shaped) to engage one or more fingers of the user. In other examples, lifting end 121 may be configured to engage a removal tool, such as, for example, pliers, a screw driver, or another tool configured to apply a force to lifting end 121 to operate levering cover 102.

Cam portion 122 defines a fulcrum end of levering cover 102 and may include an eccentric cam. Outer contact surface 124 of cam portion 122 extends on an exterior of cam portion 122 and is configured to contact surface 220. In some examples, a surface shape of cam surface 124 may be selected to enable a first force to lift lever portion 120 a first predetermined distance and a second force to lift lever portion 120 a second predetermined distance. For example, the first force may be less than the second force such that lever portion 120 is more easily lifted a first (e.g., initial) distance, thereby allowing an improved engagement with lever portion 120 (e.g., an improved grip), prior to application of the second force to lift lever portion 120 the second (e.g., final) distance to disengage device 100 from object 200. In other examples, the shape of cam portion 122 may be selected to impart any desired force profile for operation of lever portion 120.

Referring also to FIG. 2, body portion 104, in an embodiment, comprises hook end 130, pivot end 132 opposite hook end 130 and defining pin-receiving channel 134, and main portion 136 disposed between hook end 130 and pivot end 132 and defining magnet-receiving opening 138. In some examples, hook end 130 may be curved. In other examples, hook end 130 may be straight and optionally may include one or more bulbous portions or may be configured to receive and removably secure an item by mechanical coupling, friction fit, or the like.

Shunt plate 106 in an embodiment may be a relatively flat, rectangular plate-like structure, though various shapes configured to hold a magnet 108 and couple with levering cover 102 are contemplated. In an embodiment, shunt plate 106 comprises a metal material, which may be a ferromagnetic metal material.

Pin 107 forms a cylindrical rod or pin shape as depicted, though other embodiments are contemplated.

Magnetic device 108 (also referred to herein as a magnet), in an embodiment, is a relatively flat sheet magnet, that includes first end 150, second end 152 opposite first end, front surface 154 and rear surface 156 opposite front surface 154. In some examples, magnet 108 may include any of the magnetic assemblies or devices described in commonly assigned U.S. patent application Ser. No. 17/895,464, the entire contents of which is incorporated herein by reference. Embodiments of magnetic device 108 are generally configured to concentrate magnetic flux close to an outer surface of the magnetic device, and hence an attachment surface, to maximize normal and frictional holding force, as explained further below.

In one such embodiment, magnetic device 108 includes a magnetic sheet and a baseplate. The magnet sheet may define a plurality of island portions (i.e., individual magnetic regions with alternating north and south magnetic poles) and a plurality of interstitial portions, each interstitial portion of the plurality of interstitial portions disposed between two or more respective island portions of the plurality of island portions. The baseplate may include a conductive material. In an embodiment magnetic device 108 also includes a front side with a front surface 121 for connection to magnet-retaining portion 106, and a rear side with rear a surface to be positioned near a ferromagnetic attachment object.

In another embodiment, magnetic device 108 may define a channel magnetic device, i.e., channel magnet. For example, a flux of magnetic device 108 may be manipulated or improved using a shunt or channel plate, such as magnet-retaining portion 106. By adding a channel shunt plate to front surface 121 of magnetic device 108, the available flux projecting from the back of the magnet will conduct through a ferromagnetic material, such as steel, and focus more available flux towards the target ferromagnetic object, thus increasing flux density on the attachment or rear side of the magnetic device 108. Consequently, magnetic device 108, in an embodiment, may comprise a channel magnet.

In some embodiments, magnet 108 may comprise multiple magnetic regions, or pairs of north and south pole regions, such as magnets manufactured under the name Polymagnet, available from Correlated Magnetics Research, LLC, Huntsville, Alabama.

In another embodiment, magnetic device 108 may include strips of magnetic material alternating with strips of steel spacers. In one such embodiment, magnetic device 108 includes a plurality of 0.125" wide×0.125" high×2" long magnets with 0.0625" wide×0.125" high×2" long steel strips between each pair of the plurality of long, slender magnets.

Grip material 116 may comprise a structurally independent component as depicted, or in another embodiment, may simply comprise a portion of body portion 104, e.g., body portion 104 may integrate grip material 116 at a rear side and surface. In an embodiment, grip material 116 forms a rectangular shape defining central opening 140 and includes grip surface 117. Grip material 116 may surround magnet 108 and form a rim around the magnet. In some examples, main portion 136 or body portion 104 may define a channel extending around magnet-receiving opening 138 that is configured to receive at least a portion of grip material 116

In an embodiment, grip material 116 comprises a low-durometer, i.e., compressible material, with a high-coefficient of friction. In an embodiment, a material of grip material 116 is an injection molded material that has excellent tolerance control. For example, a dimensional tolerance of a thickness of grip material 116 may be within (i.e., plus or minus) 0.1 millimeters (mm), such as within 0.01 mm or within 0.001 mm. In this way, the use of a low-durometer high grip material 116 reduces tolerance stack up for production compared to other materials. Embodiments of grip material 116 material may include, but are not limited to: thermoplastic elastomer ("TPE") materials, thermoplastic polyurethane ("TPU") materials, thin silicone tape, conformal coatings (e.g., Dowsil 1-2577), 3M Grip Tape, rubber sprays and coatings (e.g., PLASTI DIP multipurpose rubber coating available from Plasti Dip International of Blaine, Minnesota), abrasive tapes, and tacky adhesive tapes.

When assembled, pin 107 fits into pin holes 126 and channel 134 to pivotally connect levering cover 102 to body portion 104. Magnetic device 108 is coupled at front surface 154 to a rear surface of magnet-retaining portion 106, and is received in openings 138 and 140, with rear surface 156 facing in a front-to-rear direction towards a potential attachment surface 220. In an embodiment, magnetic device 108 is adhered to magnet-retaining portion 106 with an adhesive offering a controlled layer thickness. Similarly, magnet-retaining portion 106 may be optionally adhered to a front surface of body portion 104, for example, with an adhesive offering a controlled layer thickness. Grip material 116 is coupled to a rear surface of body portion 104, with its grip surface 117 facing in a front-to-rear direction toward surface 220.

Referring specifically to FIG. 1, which depicts device 100 in an attachment configuration, it will be understood that device 100 may be magnetically coupled to ferromagnetic object 200 in any orientation, but in an embodiment, device 100 is configured to be coupled to a vertical surface 220 such that the weight of the item held by device 100 (and the weight of device 100) exerts a downward force Fw on device 100 due to gravity. The normal force Fn exerted by magnetic 108 of device 100 exerts a force substantially perpendicular to surface 220 (i.e., perpendicular or nearly perpendicular, such as within about 5-degrees or about 10-degrees from perpendicular), transmits the force through the structure of device 100 along a load path and toward surface 220, as depicted. A frictional or holding force Fh parallel to the ferromagnetic surface is opposite to the downward force Fw, and is proportional to the normal force Fn. The upward holding force Fh keeps holding device 100 and its held object 230 in place against ferromagnetic surface 220, preventing it from sliding down or otherwise from detaching. The holding force Fh is equal to the normal force exerted by device 100 times a static coefficient of friction of the components of device 100, such as a grip material 116 and/or magnet 108 in interaction with surface 220.

The holding force Fh, which determines how heavy of a held object 230 may be secured to surface 220, is dependent on the normal force Fn produced by magnet 108, and the combined coefficient of friction of the components touching surface 220. For a given normal force Fn, maximizing the combined coefficient of friction of the materials of device 100 in contact with surface 220 maximizes holding force Fh. At the same time, normal force is maximized by positioning magnet 108 as close as possible to surface 220. In an embodiment, holding force Fh is maximized by getting magnet as close as possible to surface 220 without touching, and by having only high-coefficient-of-friction material in contact with surface 220, such as grip material 116.

Since high-coefficient-of-friction materials tend to be soft, these materials compress when force is applied, such as when being subjected to the normal force Fn produced by magnetic device 108. Therefore, an objective of one embodiment of this disclosure is to precisely control and minimize the gap G between magnet 108 and surface 220, as illustrated in FIG. 4. To accomplish this, determining and controlling that amount of compression of structures, such as grip material 116, subject to normal force Fn due to the normal force being transmitted along a load path from surface 220 to magnetic device 220 aids in providing an accurately sized and uniform gap G.

In an embodiment that makes it easier to predict and control expected compression of structures in the load path, the number of components and materials in the load path are minimized, and/or only a single significantly compressible component is in the load path. In one such embodiment, grip material 116 is relatively compressible, and is attached directly to a relatively non-compressible metal shunt plate 106 and/or a relatively non-compressible body portion 104, such that only grip material 116 measurably compresses due to normal force Fn. In other words, only grip material 116 and shunt plate 106 and/or body portion 104 are in the load path between contact at surface 220 and magnet 108, and only grip material 116 significantly compresses under load.

Referring to FIG. 6, device 100 in a release position is depicted. To release device 100 from ferromagnetic object 200, lever portion 120 is lifted moved away from body portion 104, causing cover 102 to pivot about cam portion 122, and causing cam portion 122 to rotate. Surface 124 is in contact with surface 220, and the applied force pushes end 132 of body portion 104 in a rear-to-front direction, away from surface 220. Simultaneously, end 150 (see also FIG. 2) of magnetic device 108 is moved away from surface 220, increasing a gap G between surface 200 and magnet surface 156 (see also FIG. 2). With the movement and resulting increased gap, the normal force Fn applied by magnetic device 108 at ends 150, 132 is significantly decreased, allowing device 100 to be easily released or removed from ferromagnetic object 200. Without such mechanical advantage, and with high normal forces Fn, a user would otherwise have difficulty removing device 100 from object 200.

Figure 7A:
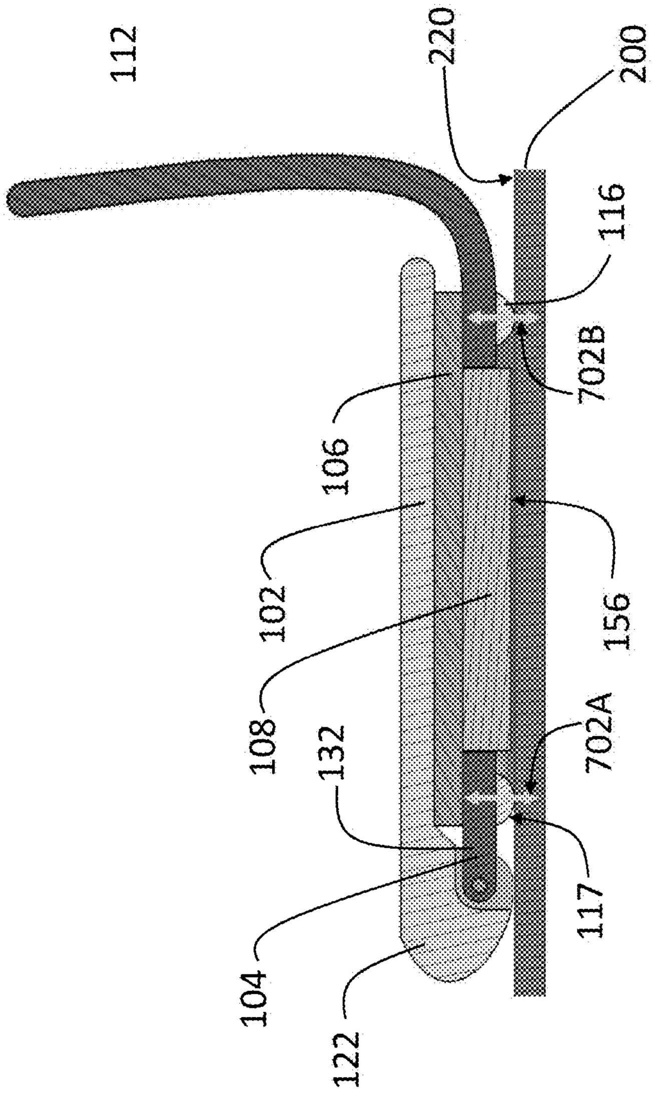
FIG. 7A is a side view of an alternate embodiment of a detachable magnetic holding device attached to a ferromagnetic object, according to an embodiment.

As illustrated in FIG. 7A, device 100 is configured such that gap G is non-zero, such that load path 702A and 702B (collectively, load path 702) is transmitted through grip material 116. By transmitting load path 702 through grip material 116, device 100 may be configured to maximize a holding force Fh between grip material 116 and surface 220. Moreover, by controlling gap G to minimize a distance between surface 156 of magnet 108 and surface 220 of object 200 the normal force Fn may be greater than if gap G were larger. In some examples, gap G may be within a range from about 0.01 millimeters (mm) to about 0.5 mm.

Figure 7B:
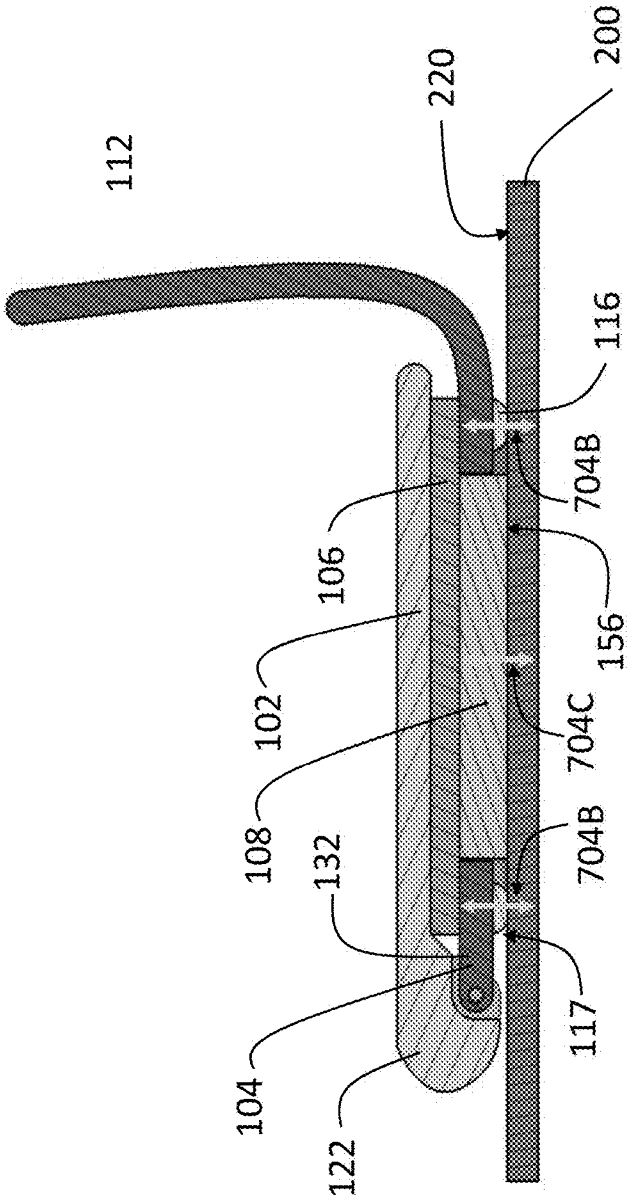
FIG. 7B is a side view of an alternate embodiment of a detachable magnetic holding device attached to a ferromagnetic object, according to an embodiment.

In an alternate embodiment, as illustrated in FIG. 7B, device 100 is configured such that gap G is zero. In other words, surface 156 of magnetic device 108 is in direct contact with surface 220 when device 100 is coupled or attached to ferromagnetic object 200. In this way, load path 704A, 704B, and 704C (collectively, load path 704) is transmitted through grip material 116 as well as through at least a portion of magnet 108.

In this alternate embodiment, load path 704 of the normal forces includes both magnetic portion 108 and grip material 116, since surface 156 of magnetic device 108 is also touching surface 220, such that normal forces Fn are transferred through magnetic portion 108 and through grip material 116, with some force transferred through magnetic portion 108 and some force transferred through grip material 116. A combined coefficient of friction depends now on both the material of surface 156 of magnetic device 108, and the material of grip material 116 as both are in contact with surface 220. In an embodiment, a material of the contacting surface 156 of magnetic device 108 may be harder and have a lower coefficient of friction as compared to the low-durometer and high-coefficient-of-friction material of grip material 116, thus relatively lowering a combine coefficient of friction of the contacting portions of device 100 on surface 220, as compared to a the example illustrated in FIG. 7A.

In an embodiment, about 20% of the load is travelling through surface 156 of the magnet and about 80% of the load is travelling through grip surface 117 of grip material 116. In the embodiment of FIG. 7, grip material 116 has compressed to the point that magnetic device 108 contacts surface 220.

In some examples, to maintain a selected gap G, grip material 116 may extend over at least a portion of surface 156 of magnet 108. For example, a grip material may be formed on a surface of a magnet, as described in U.S. application Ser. No. 18/455,122, entitled Leverless Detachable Magnetic Hook, filed Aug. 24, 2023, and published on Feb. 29, 2024 as US 2024/0071667, the entire content of which is incorporated by reference herein.

Figure 8:
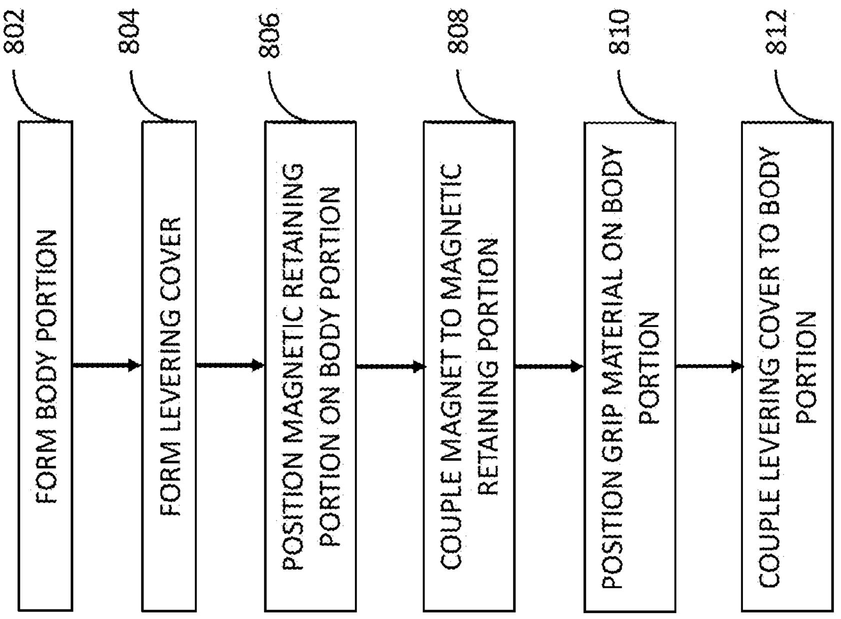
FIG. 8 is a block flow diagram illustrating an example technique of forming a detachable magnetic holding device.

Device 100 and the components thereof may be formed using any suitable technique. FIG. 8 is a block flow diagram illustrating an example technique of forming a detachable magnetic holding device.

In some examples, the technique illustrated in FIG. 8 includes forming body portion 104 defining a first surface, a second surface opposite the first surface, and magnet-receiving opening 138 (802). In some examples, forming body portion 104 may include forming the body portion to define hook end 130, pivot end 132 defining pin-receiving channel 134, and main portion 136 defining magnet-receiving opening 138 disposed between hook end 130 and pivot end 132. Body portion 104 may be formed using any suitable technique plastic or metal components, including, but not limited to, molding, casting, forging, stamping, sintering, thermoforming, additive manufacturing, substrative manufacturing, or the like.

In some examples, the components of body portion 104 may be integrally formed. In other examples, the components of body portion 104 may be separately formed and later joined. Components of body portion 104 may be joined using any suitable means for joining plastic or metal components, including, but not limited to, adhesive bonding, brazing, compression molding, hot staking, mechanical fastening, press or snap fit, soldering, solvent bonding, and welding (e.g., arc, electron beam, infrared, laser, radio frequency, resistance, thermal, ultrasonic, and vibration).

In some examples, the technique illustrated in FIG. 8 also includes forming a levering cover 102 having lever portion 120 and cam portion 122 (804). In some examples, the technique may include forming cam portion 122 to define one or more pin-receiving holes 126 and outer surface 124. Levering portion 120 may be formed using any suitable technique plastic or metal components, including, but not limited to, molding, casting, forging, stamping, sintering, thermoforming, additive manufacturing, substrative manufacturing, or the like.

In some examples, the components of levering portion 120 may be integrally formed. In other examples, the components of levering portion 120 may be separately formed and later joined. Components of levering portion 120 may be joined using any suitable means for joining plastic or metal components, including, but not limited to, adhesive bonding, brazing, compression molding, hot staking, mechanical fastening, press or snap fit, soldering, solvent bonding, and welding (e.g., arc, electron beam, infrared, laser, radio frequency, resistance, thermal, ultrasonic, and vibration).

In some examples, the technique illustrated in FIG. 8 also includes positioning magnetic-retaining portion 106 on a first surface of body portion 104 (806). Positioning magnetic-retaining portion 106 may include, in some examples, adhering magnetic-retaining portion 106 to the first surface of body portion 104, such as with a controlled layer thickness adhesive. For example, adhesive may be applied to magnetic-retaining portion 106 and/or body portion 104 using a technique to control a layer thickness (e.g., bead thickness) of the adhesive to provide a substantially uniform adhesive thickness and, optionally, adhesive coverage, when joining magnetic-retaining portion 106 and body portion 104.

In some examples, the technique illustrated in FIG. 8 also includes coupling a first surface of a magnet to the magnetic-retaining portion (808). Magnet 108 may be positioned on magnetic-retaining portion 106 such that at least a portion of magnet 108 is disposed within magnet-receiving opening 138 when magnet-retaining portion 106 (with magnet 108 coupled thereto) is positioned on body portion 104. In some examples, coupling magnet 108 to magnetic-retaining portion 106, may include adhering magnet 108 to magnetic-retaining portion 106, such as with a controlled layer thickness adhesive. For example, an adhesive may be applied to magnetic-retaining portion 106 and/or magnet 108 using a technique to control a layer thickness (e.g., bead thickness) of the adhesive to provide a substantially uniform adhesive thickness and, optionally, adhesive coverage, when joining magnetic-retaining portion 106 and magnet 108.

In some examples, the technique also may include forming magnet 108. For example, forming magnet 108 may include forming a magnetic sheet defining a plurality of magnetic island portions with alternating north and south magnetic poles and a plurality of interstitial portions, each interstitial portion of the plurality of interstitial portions disposed between two or more respective island portions of the plurality of island portions.

In some examples, the technique illustrated in FIG. 8 also includes positioning a grip material 116 on body portion 1045 to surround at least a portion of magnet-receiving opening 138 (810). Positioning grip material 116 may include, for example, friction fitting grip material 116 into a channel defined by body portion 108, adhering grip material to body portion 104 (e.g., using a controlled layer thickness technique), or forming grip material on body portion 104 (e.g., extruding, overmolding, thermoforming, or the like).

In some examples, the technique illustrated in FIG. 8 also includes coupling the levering cover to the body portion (812). Cam portion 124 may be pivotally connected to an end of body portion 104. For example, coupling levering cover 120 to body portion 140 may include pivotally coupling pin-receiving channel 134 to pin-receiving holes 126 with pin 107.

All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The following clauses illustrate the subject matter described herein.

Clause 1. A detachable magnetic device, comprising: a body portion defining a first surface and a second surface opposite the first surface, wherein the body portion comprises: a hook end; a pivot end opposite hook end and defining a pin-receiving channel; and a main portion disposed between hook end and pivot end, wherein the main portion defines a magnet-receiving opening; a levering cover comprising a lever portion and a cam portion defining one or more pin-receiving holes; a pin extending through the pin-receiving channel and at least a portion of the one or more pin-receiving holes to pivotally couple the body portion to the levering cover; a magnet-retaining portion extending across at least a portion of the first surface of the body portion; a magnet defining a first surface coupled to the magnetic-retaining portion and a second surface opposite the first surface, wherein at least a portion of the magnet is disposed within the magnet-receiving opening and the second surface of the magnet extends substantially parallel to the second surface of the body portion; and a grip material disposed on the body portion and extending beyond the second surface of the body portion, wherein the magnet is configured to magnetically couple the detachable magnetic device to a ferromagnetic object.

Clause 2. The detachable magnetic device of Clause 1, wherein the cam portion of the levering cover further comprises an outer contact surface configured to contact a surface of the ferromagnetic object when the levering cover is rotated relative to the body portion.

Clause 3. The detachable magnetic device of Clause 1 or 2, wherein the cam portion of the levering cover further comprises a cam cavity configured to receive at least a portion of the pivot end of the body portion.

Clause 4. The detachable magnetic device of any one of Clauses 1 through 3, wherein the magnet-retaining portion comprises a shunt plate.

Clause 5. The detachable magnetic device of any one of Clauses 1 through 4, wherein the magnet is coupled to the magnet-retaining portion with a controlled layer thickness adhesive.

Clause 6. The detachable magnetic device of any one of Clauses 1 through 5, wherein the second surface of the magnet extends beyond a plane defined by the second surface of the body portion.

Clause 7. The detachable magnetic device of any one of Clauses 1 through 6, wherein the magnet comprises magnetic sheet defining a plurality of magnetic island portions with alternating north and south magnetic poles and a plurality of interstitial portions, each interstitial portion of the plurality of interstitial portions disposed between two or more respective island portions of the plurality of island portions.

Clause 8. The detachable magnetic device of any one of Clauses 1 through 7, wherein the grip material defines a grip surface, wherein a plane defined by the grip surface extends beyond a plane defined by the second surface of the magnet a distance D, wherein the distance D is within a range from about 0.01 millimeters to about 0.5 millimeters.

Clause 9. The detachable magnetic device of any one of Clauses 1 through 8, wherein the body portion defines a channel configured to receive at least a portion of the grip material.

Clause 10. The detachable magnetic device of any one of Clauses 1 through 9, wherein the grip material is configured to compress in response to a force between the magnetic device and the ferromagnetic object.

Clause 11. The detachable magnetic device of any one of Clauses 1 through 10, wherein the lever portion of levering cover comprises a lifting end configured to be engaged by one or more fingers or a removal tool.

Clause 12. The detachable magnetic device of Clause 11, wherein the lifting end extends beyond an end of the magnet-retaining portion.

Clause 13. A detachable magnetic device, comprising: a body portion defining a first surface and a second surface opposite the first surface, wherein the body portion defines a magnet-receiving opening; a levering cover comprising a lever portion and a cam portion, wherein the cam portion is pivotally connected to an end of the body portion; a magnet-retaining portion extending across at least a portion of the first surface of the body portion; a magnet coupled to the magnetic-retaining portion, wherein at least a portion of the magnet is disposed within the magnet-receiving opening; and a grip material disposed on the second surface of the body portion and surrounding at least a portion of the magnet-receiving opening, wherein the magnet is configured to magnetically couple the detachable magnetic device to a ferromagnetic object, wherein the cam portion is configured to contact a surface of the ferromagnetic object when the levering cover rotated relative to the body portion.

Clause 14. The detachable magnetic device of Clause 13, wherein the body portion defines a pin-receiving channel, wherein the cam portion of the levering cover defines one or more pin-receiving holes, wherein the detachable magnetic device further comprises a pin extending through the pin-receiving channel and at least a portion of the one or more pin-receiving holes to pivotally couple the body portion to the levering cover.

Clause 15. A method of forming a detachable magnetic device, comprising: forming a body portion defining a first surface and a second surface opposite the first surface, wherein the body portion defines a magnet-receiving opening; forming a levering cover comprising a lever portion and a cam portion; positioning a magnetic-retaining portion on the first surface of the body portion; coupling a first surface of a magnet to the magnetic-retaining portion, wherein at least a portion of the magnet is disposed within the magnet-receiving opening; positioning a grip material on the second surface of the body portion to surround at least a portion of the magnet-receiving opening; and coupling the levering cover to the body portion, wherein the cam portion is pivotally connected to an end of the body portion.

Clause 16. The method of Clause 15, wherein forming the body portion comprises forming the body portion to define a pin-receiving channel, wherein forming the levering cover comprises forming the cam portion of the lever cover to define one or more pin-receiving holes, and wherein coupling the levering cover to the body portion comprises pivotally coupling the pin-receiving channel to the one or more pin-receiving hole with a pin.

Clause 17. The method of Clause 15 or 16, wherein the grip material defines a grip surface opposite the second surface of the body portion, wherein the magnet defines a second surface opposite the first surface, wherein the second surface of the magnet is a distance D from the grip surface, and wherein the distance D is within a range from about 0.01 millimeters to about 0.5 millimeters.

Clause 18. The method of any one of Clauses 15 through 17, wherein positioning the magnetic-retaining portion comprises adhering the magnetic-retaining portion to the first surface of the body portion.

Clause 19. The method of any one of Clauses 15 through 18, wherein the method further comprises forming the magnet, wherein the magnet comprises magnetic sheet defining a plurality of magnetic island portions with alternating north and south magnetic poles and a plurality of interstitial portions, each interstitial portion of the plurality of interstitial portions disposed between two or more respective island portions of the plurality of island portions.

Clause 20. The method of any one of Clauses 15 through 19, wherein coupling the first surface of the magnet to the magnetic-retaining portion, comprises adhering the first surface of the magnet to the magnetic-retaining portion with a controlled layer thickness adhesive.

What is claimed is:

1. A detachable magnetic device, comprising:

- a body portion defining a first surface and a second surface opposite the first surface, wherein the body portion comprises:
  - a hook end;
  - a pivot end opposite hook end and defining a pin-receiving channel; and
  - a main portion disposed between hook end and pivot end, wherein the main portion defines a magnet-receiving opening;
- a levering cover comprising a lever portion and a cam portion defining one or more pin-receiving holes;
- a pin extending through the pin-receiving channel and at least a portion of the one or more pin-receiving holes to pivotally couple the body portion to the levering cover;
- a magnet-retaining portion extending across at least a portion of the first surface of the body portion;
- a magnet defining a first surface coupled to the magnetic-retaining portion and a second surface opposite the first surface, wherein at least a portion of the magnet is disposed within the magnet-receiving opening and the second surface of the magnet extends substantially parallel to the second surface of the body portion; and
- a grip material disposed on the body portion and extending beyond the second surface of the body portion,
- wherein the magnet is configured to magnetically couple the detachable magnetic device to a ferromagnetic object.

2. The detachable magnetic device of claim 1, wherein the cam portion of the levering cover further comprises an outer contact surface configured to contact a surface of the ferromagnetic object when the levering cover is rotated relative to the body portion.

3. The detachable magnetic device of claim 1, wherein the cam portion of the levering cover further comprises a cam cavity configured to receive at least a portion of the pivot end of the body portion.

4. The detachable magnetic device of claim 1, wherein the magnet-retaining portion comprises a shunt plate.

5. The detachable magnetic device of claim 1, wherein the magnet is coupled to the magnet-retaining portion with a controlled layer thickness adhesive.

6. The detachable magnetic device of claim 1, wherein the second surface of the magnet extends beyond a plane defined by the second surface of the body portion.

7. The detachable magnetic device of claim 1, wherein the magnet comprises magnetic sheet defining a plurality of magnetic island portions with alternating north and south magnetic poles and a plurality of interstitial portions, each interstitial portion of the plurality of interstitial portions disposed between two or more respective island portions of the plurality of island portions.

8. The detachable magnetic device of claim 1, wherein the grip material defines a grip surface, wherein a plane defined by the grip surface extends beyond a plane defined by the second surface of the magnet a distance D, wherein the distance D is within a range from about 0.01 millimeters to about 0.5 millimeters.

9. The detachable magnetic device of claim 1, wherein the body portion defines a channel configured to receive at least a portion of the grip material.

10. The detachable magnetic device of claim 1, wherein the grip material is configured to compress in response to a force between the magnetic device and the ferromagnetic object.

11. The detachable magnetic device of claim 1, wherein the lever portion of levering cover comprises a lifting end configured to be engaged by one or more fingers or a removal tool.

12. The detachable magnetic device of claim 11, wherein the lifting end extends beyond an end of the magnet-retaining portion.

13. A detachable magnetic device, comprising:

- a body portion defining a first surface and a second surface opposite the first surface, wherein the body portion defines a magnet-receiving opening;
- a levering cover comprising a lever portion and a cam portion, wherein the cam portion is pivotally connected to an end of the body portion;
- a magnet-retaining portion extending across at least a portion of the first surface of the body portion;
- a magnet coupled to the magnetic-retaining portion, wherein at least a portion of the magnet is disposed within the magnet-receiving opening; and
- a grip material disposed on the second surface of the body portion and surrounding at least a portion of the magnet-receiving opening,
- wherein the magnet is configured to magnetically couple the detachable magnetic device to a ferromagnetic object,
- wherein the cam portion is configured to contact a surface of the ferromagnetic object when the levering cover rotated relative to the body portion.

14. The detachable magnetic device of claim 13, wherein the body portion defines a pin-receiving channel, wherein the cam portion of the levering cover defines one or more pin-receiving holes, wherein the detachable magnetic device further comprises a pin extending through the pin-receiving channel and at least a portion of the one or more pin-receiving holes to pivotally couple the body portion to the levering cover.

15. A method of forming a magnetic hook device, comprising:

- forming a body portion defining a first surface and a second surface opposite the first surface, wherein the body portion defines a magnet-receiving opening;
- forming a levering cover comprising a lever portion and a cam portion;
- positioning a magnetic-retaining portion on the first surface of the body portion;

coupling a first surface of a magnet to the magnetic-retaining portion, wherein at least a portion of the magnet is disposed within the magnet-receiving opening;

positioning a grip material on the second surface of the body portion to surround at least a portion of the magnet-receiving opening; and coupling the levering cover to the body portion, wherein the cam portion is pivotally connected to an end of the body portion.

16. The method of claim 15, wherein forming the body portion comprises forming the body portion to define a pin-receiving channel, wherein forming the levering cover comprises forming the cam portion of the lever cover to define one or more pin-receiving holes, and wherein coupling the levering cover to the body portion comprises pivotally coupling the pin-receiving channel to the one or more pin-receiving hole with a pin.

17. The method of claim 16, wherein the grip material defines a grip surface opposite the second surface of the body portion, wherein the magnet defines a second surface opposite the first surface, wherein the second surface of the magnet is a distance D from the grip surface, and wherein the distance D is within a range from about 0.01 millimeters to about 0.5 millimeters.

18. The method of claim 15, wherein positioning the magnetic-retaining portion comprises adhering the magnetic-retaining portion to the first surface of the body portion.

19. The method of claim 15, wherein the method further comprises forming the magnet, wherein the magnet comprises magnetic sheet defining a plurality of magnetic island portions with alternating north and south magnetic poles and a plurality of interstitial portions, each interstitial portion of the plurality of interstitial portions disposed between two or more respective island portions of the plurality of island portions.

20. The method of claim 15, wherein coupling the first surface of the magnet to the magnetic-retaining portion, comprises adhering the first surface of the magnet to the magnetic-retaining portion with a controlled layer thickness adhesive.

* * * * *